Aug. 31, 1954     L. JONES     2,687,734

VARIABLE THROAT FOR CORN SHELLERS

Filed April 19, 1951

INVENTOR.

LESLIE JONES

BY

ATTORNEY

Patented Aug. 31, 1954

2,687,734

UNITED STATES PATENT OFFICE 2,687,734

VARIABLE THROAT FOR CORN SHELLERS

Leslie Jones, Beemer, Nebr.

Application April 19, 1951, Serial No. 221,870

2 Claims. (Cl. 130—6)

This invention relates to an improvement in corn shellers, and more particularly to an improvement over the throat plate for corn shellers described in applicant's co-pending application, Serial No. 184,085, now abandoned, and applicant's Patent No. 2,493,973.

In the conventional corn sheller the discharge of cobs and shucks from the shelling cage is intended to be automatically controlled by means of a rotary spring-resisted damper. These dampers, however, have not been universally successful, since the throat opening often becomes clogged with cobs and shucks, and the clogged mass is rotated against the partition plate of the sheller to rapidly wear and enlarge the throat opening so as to make accurate control impossible.

The principal object of this invention is to provide means for controlling the throat opening in the partition plate so that the discharge therethrough may be accurately regulated to produce maximum shelling results upon the particular corn being shelled, and so that wear on the plate can be taken up as required.

Another object of the present invention is to provide a controllable throat opening for corn shellers which will enable the attendant to quickly relieve any clogging of the throat which may occur, without stopping the sheller.

A further object is to so construct the device that it can be quickly and easily applied to a conventional type of corn sheller without the use of tools other than a simple wrench.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
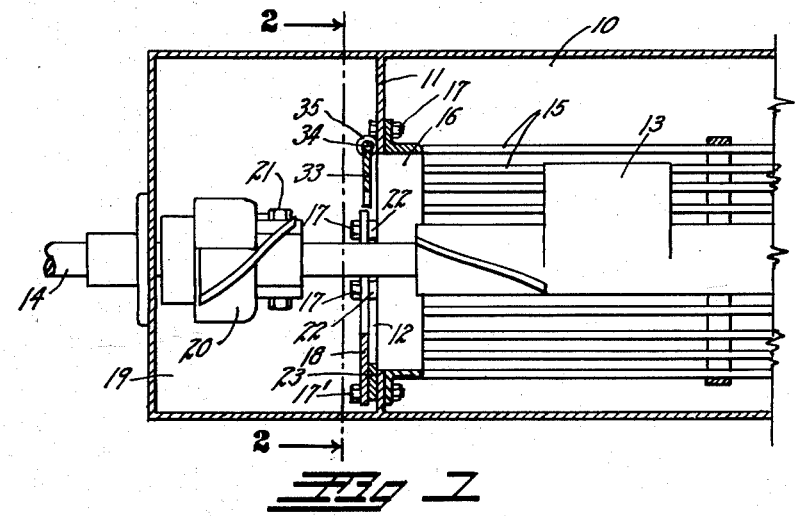
Fig. 1 is a fragmentary, vertical, longitudinal section through the cob discharge extremity of a conventional corn sheller, illustrating the invention in place therein.

A conventional corn sheller of the type to which this invention is applicable consists of an elongated housing 10 into one extremity of which the ears of corn are fed. The housing is provided with a partition 11 adjacent the discharge extremity thereof having a central circular throat opening 12 through which the cobs and shucks discharge after the shelling operation is completed. The shelling is done by means of a rotary beater-type shelling head 13 mounted on a beater shaft 14 extending throughout the entire length of the housing 10. A cylindrical rod cage 15 surrounds the shelling head 13, and the shelled corn passes through the cage 15 into the housing 10. The cage 15 is supported from a cage ring 16 bolted by means of suitable bolts 17 about the throat opening 12 in the partition 11.

The partition 11 divides the shelling portion of the housing from a cob compartment 19. A shuck-distributing beater 20 is mounted on the shaft 14 within the cob compartment 19. The beater 20 is formed in two halves which are clamped about the shaft 14 by means of clamp bolts 21.

The elements thus far described are present in a conventional corn sheller of the type for which the invention is designed. In the usual sheller, however, a spring-resisted damper cone is mounted on the shaft 14 within the throat opening 12. For the purposes of this invention, the damper cone is eliminated.

In applying this improvement to the corn sheller, an arcuate throat plate 18 is secured on the cob compartment side of the partition 11 by means of certain of the present conventional bolts 17, which are already in place on the sheller. The throat plate 18 has an inner radius less than, and concentric with, the opening 12 and extends from a position at the bottom of the opening upwardly along one side thereof, covering an arc of substantially 100°.

The plate 18 is spaced from the partition 11 by means of spacing washers 22 about the bolts 17. The spacing is sufficient to allow an arcuate valving plate 23 to be positioned between the throat plate 18 and the partition 11. The valving plate has a contour coinciding with the contour of the throat plate 18, and is pivotally mounted on one of the lower bolts 17, as indicated at 17', so that when in the closed position of Fig. 3, the two plates 18 and 23 will materially reduce the diameter of the throat opening 12 over the entire lower half of the latter.

The valving plate 23 is swung about the axis of the bolt 17' by means of an adjusting lever 24. The adjusting lever 24 is mounted on a pivot bolt 25 on the partition 11.

The lower extremity of the lever 24 is provided with an elongated opening 27 which engages a projecting pin or bolt 28 in the valving plate 23 to impart a swinging movement to the latter. The upper extremity of the lever 24 projects upwardly and outwardly through a lever opening 29 in the housing 10.

The valving plate 23 is held against the partition 11 by means of an overlapping guide bar 30 which extends from one of the bolts 17 upwardly to a cap screw 31 in the partition. The plate 23 is arcuately slotted, as indicated at 32, to allow it to swing about the lower bolt 17 in the guide bar 30.

Figures 2, 3:
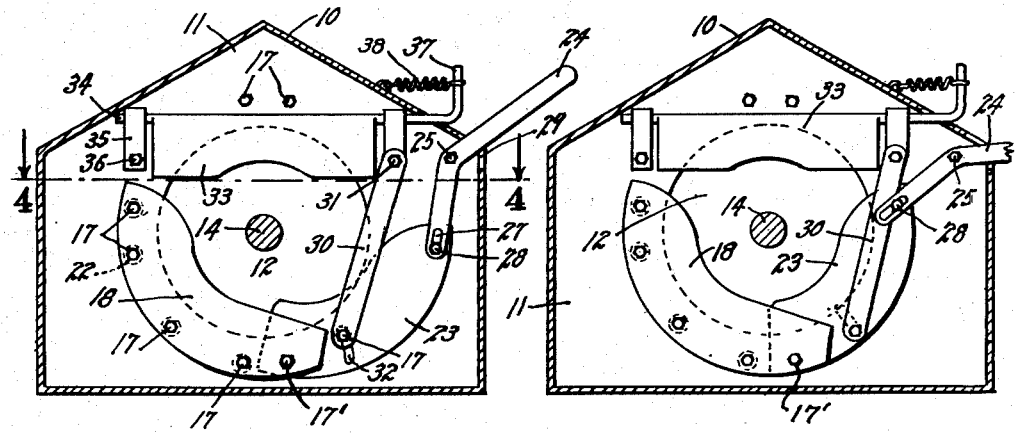
Fig. 2 is a cross-section therethrough, taken on the line 2—2, Fig. 1, illustrating the improved means for controlling the throat opening in the open position.
Fig. 3 is a similar cross-section, illustrating the throat control means in the closed position.
Figure 4:
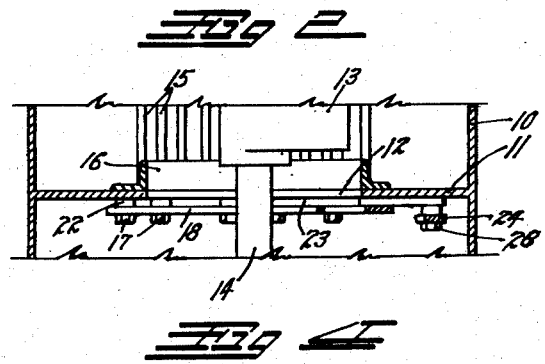
Fig. 4 is a fragmentary, horizontal section, taken on the line 4—4, Fig. 2.

It can be readily seen that if the projecting extremity of the lever 24 is lifted, the plate 23 will be swung to the open position of Fig. 2, and if the lever be forced downwardly, the plate 23 will be swung to the closed position of Fig. 3. Thus, the area of the throat opening 12 can be accurately varied while the sheller is in operation from the maximum area of Fig. 2 to the minimum area of Fig. 3.

A swinging damper plate 33 is suspended from a rotary rod 34 extending horizontally across the top of the throat opening 12. The rod 34 is rotatably mounted in bearing clips 35 secured to the partition 11 above and at each side of the throat opening by means of the cap screw 31, and a similar cap screw 36. One extremity of the rod 34 is bent at an angle to the main rod axis and extends through an opening in the top of the housing 10 to form a handle 37. A spring 38 may be provided to resist movement of the handle 37. The swinging damper plate resists the flow of cobs and shucks through the throat opening 12. The amount of resistance is determined by the reaction of the spring 38, which is pre-set for the most efficient results.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. The combination with a partition in a corn sheller of the type having a substantially circular throat opening therein, of a fixed arcuate throat plate secured to said partition around substantially one-half the lower portion of the throat opening therein and extending radially into said opening to reduce the area of the latter; means supporting said fixed arcuate plate from, and in spaced, parallel relation to, said partition; an arcuate valving plate pivoted at one extremity of said throat plate, said valving plate being positioned at its one extremity in the space between said throat plate and said partition and operable to move into said opening to approximately the same extent as said throat plate extends; an operating lever; pivot means mounting said operating lever on said partition; and means connecting said lever to said valving plate so that movements of said lever will be communicated to said valving plate.

2. The combination with a partition in a corn sheller of the type having a circular throat opening therein, of a fixed arcuate throat plate secured to said partition around substantially one-half the lower portion of the throat opening therein and extending radially into said opening to reduce the area of the latter; means supporting said fixed arcuate plate from, and in spaced, parallel relation to, said partition; an arcuate valving plate pivoted to said partition at the bottom of said opening and at one extremity of said throat plate and adapted to swing into said opening, said valving plate being positioned at its one extremity in the space between said throat plate and said partition and acting in cooperation with said fixed, arcuate throat plate to reduce the radius of the lower half of said opening; an operating lever; pivot means mounting said operating lever on said partition; means connecting said lever to said valving plate so that movements of said lever will be communicated to said valving plate; and a guide bar secured at its extremities to said partition and extending across said valving plate and acting to slidably hold said valving plate against said partition.

References Cited in the file of this patent
UNITED STATES PATENTS

| Number | Name | Date |
| --- | --- | --- |
| 790,289 | Conner | May 23, 1905 |
| 882,723 | Stradley | Mar. 24, 1908 |
| 999,072 | Watts | July 25, 1911 |
| 1,390,030 | Gilman | Sept. 6, 1921 |
| 2,073,742 | Gilson | Mar. 16, 1937 |
| 2,493,973 | Jones | Jan. 10, 1950 |